No. 613,583. Patented Nov. 1, 1898.
L. N. LYON, JR.
CUSHION TIRE RETAINER FOR VEHICLE WHEELS.
(Application filed Mar. 15, 1898.)
(No Model.)
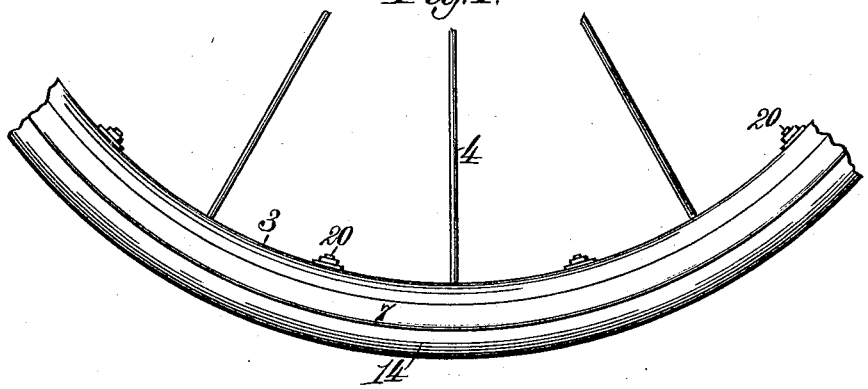
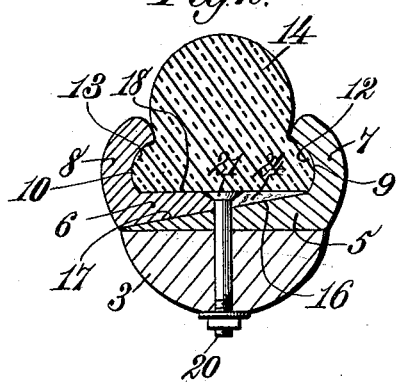
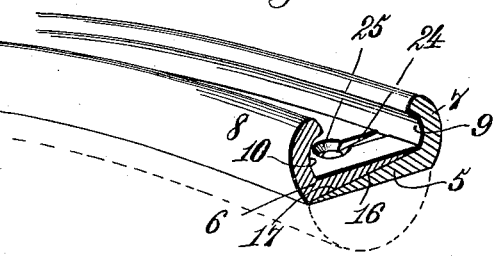
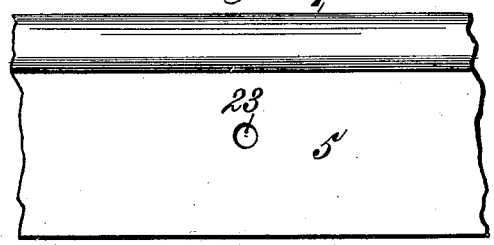
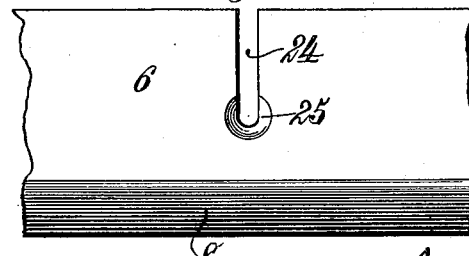
Witnesses.
Robert Emmett.
Philip N. Tilden.
Inventor.
Leonidas N. Lyon Jr.
By James L. Norris.
Atty.
THE NORRIS PETERS CO., PHOTO-LITHO., WASHINGTON, D. C.

UNITED STATES PATENT OFFICE.

LEONIDAS NICHOLAS LYON, JR., OF WACO, TEXAS.

CUSHION-TIRE RETAINER FOR VEHICLE-WHEELS.

SPECIFICATION forming part of Letters Patent No. 613,583, dated November 1, 1898.

Application filed March 15, 1898. Serial No. 673,947. (No model.)

*To all whom it may concern:*

Be it known that I, LEONIDAS NICHOLAS LYON, Jr., a citizen of the United States, residing at Waco, in the county of McLennan and State of Texas, have invented new and useful Improvements in Cushion-Tire Retainers for Vehicle-Wheels, of which the following is a specification.

This invention relates more particularly to devices for retaining cushion or elastic tires on the rims of wheels designed for buggies and other road-vehicles, although the devices may be employed for holding cushion-tires on the wheels of bicycles and analogous wheels.

The chief object of my invention is to provide novel, simple, efficient, economical, and durable devices for detachably retaining such tires as are made from sections of rubber cut to the required length to encircle the wheel-rim and which consequently have two ends that may be more or less cut off to shorten the section and render it possible to change the tire from a rear wheel to a front wheel of less diameter and to conveniently remove the tire for repairs and replace it in operative connection with the wheel-rim, where it will be firmly and securely held. This object is accomplished in the manner and by the means hereinafter described and claimed, reference being made to the accompanying drawings, in which—

Figure 1 is a side view of a portion of a wheel having a cushion-tire held upon the wheel-rim by my improved tire-retaining devices. Fig. 2 is a detail sectional view taken on the line 2 2, Fig. 1. Fig. 3 is a broken perspective view showing a portion of a wheel-rim and portions of my improved tire-retaining devices thereon, and Figs. 4 and 5 are detail plan views of portions of the two sections of the tire-retainer to clearly show the circular bolt-hole in one and the open-ended slot with its countersunk bolt-hole in the other.

In order to enable those skilled in the art to make and use my invention, I will now describe the same in detail, referring to the drawings, wherein the numeral 3 indicates the rim of a wheel, and 4 the spokes. This wheel may be designed for a buggy or other road-vehicle or for a bicycle or other velocipede, and since the construction of the wheel itself may be variously modified it is deemed unnecessary to enter into details of explanation. The rim, however, is preferably constructed with a perfectly flat periphery to receive the tire-retaining devices, which comprise two circular sections 5 and 6, formed, respectively, with outwardly-projecting circumferential curved flanges 7 and 8. The extremities or outer edge portions of these flanges trend toward each other, and the inner surfaces of the flanges are constructed, respectively, with circular dovetails 9 and 10, which receive, engage, and hold lateral dovetail projections or flange-like ribs 12 and 13, formed integral with the solid cushion-tire 14. This tire will usually be composed of rubber and its inner surface made perfectly flat to rest squarely against the flat inner surface of the retainer-section 6. The two retainer-sections 5 and 6 are independent of one another, or, rather, they are separate pieces, and are formed with similar adjacent inclined surfaces 15 and 16, resting one against the other. The cross-sectional shape of the retainer-sections is such that their base portions 5 and 6 when placed together form substantially a rectangle; but each is substantially V-shaped, so that when brought together the inner surface 17 of the section 5 will rest squarely against the flat surface of the wheel-rim and the outer surface 18 of the section 6 will rest squarely against the flat inner surface of the cushion-tire 14. By this construction a firm, solid, and substantial base of support of all the parts is obtained, and strong, durable, efficient, and economical tire-retaining sections are provided. The sections 5 and 6 are rigidly connected with the wheel-rim, Fig. 3, through the medium of bolts or screws 20, having conoidal-shaped heads 21 at one end and screw-nuts at the opposite end. The retainer-section 5 is provided at its median line with a series of circular or other suitably-shaped bolt-holes, as at 23, while the section 6 is constructed at regular intervals corresponding with the bolt-holes 23 with lateral open-ended slots 24, terminating at their inner or closed ends in countersunk bolt-holes 25, the construction being such that after the retainer-section 5 is applied to the wheel-rim the retainer-section 6 can be slipped laterally into position and clamped down upon the section 5, as I will now explain. The section 5 is first placed upon the periphery of the wheel 19 and the bolts or screws 20 are passed through the bolt-holes 23 and through the coincident bolt-holes in the wheel-rim. Prior to tightening the bolts the retainer-section 6 is slipped laterally into position, which is permitted by the lateral open-ended slots 24. When the section 6 is in correct position, the conoidal heads 21 of the bolts or screws will register with the countersunk bolt-holes 25, and then by tightening the bolts or screws the two retainer-sections are firmly clamped one upon the other, and both are rigidly and securely attached to the wheel-rim. The cushion-tire 14 is inserted into correct position between the flanges 7 and 8 of the retainer-sections before the retainer-section 6 is adjusted to its normal position, where its countersunk bolt-holes register with the conoidal heads of the bolts or screws, as will be obvious without further explanation.

When the parts are in operative connection, the lateral dovetail projections or flange-like ribs 12 and 13 enter into and are engaged by the surfaces of the dovetails or grooves 9 and 10, formed in the inner surfaces of the flanges 7 and 8, whereby the cushion-tire is effectually retained in position upon the wheel and cannot under any circumstances become displaced or disarranged as long as the retainer-sections are held in correct position on the wheel-rim.

The form or shape of the dovetails or grooves 9 and 10 and of the dovetail projections or flange-like ribs 12 and 13 may be varied without departing from the spirit of my invention, and the tread of the tire may be of any desired cross-sectional contour.

The cushion-tire is not intended to be a continuous or endless tire, like the ordinary tire for a bicycle or other wheel, but is made in straight lengths, like rope, for instance, which is cut into sections of the proper length to be fitted around the circumference of the wheel and to be held by the tire-retainers in the manner before explained. By this means a tire when worn can be conveniently removed and a new one placed in position, or the cushion-tire on a rear wheel of comparatively large diameter can be placed upon a front wheel of smaller diameter by simply shortening the length of the tire-section and fitting it into position, as will be obvious.

By the employment of my improved tire-retaining devices the cushion-tire can be made in straight lengths, cut into sections, and fitted to the wheels by the user of the vehicle as well as this could be done at the factory, and if a part of the tire becomes damaged, cut, or worn the defective part can be cut out and a new piece inserted to prolong the life of the tire and at the same time reduce the cost of repair to a minimum.

According to my invention any one can effect repairs or place new tires in position with simple tools, such as a wrench and a knife.

The invention is susceptible of being applied to wheels already in use, and the parts may be composed of any material suitable for the purpose in hand.

Having thus described my invention, what I claim is—

1. The combination with a wheel-rim, of a tire-retainer, consisting of two independent circular sections having opposing inclined surfaces seated one against the other, one section having bolt-holes and the other constructed with lateral open-ended slots terminating at their inner ends in bolt-holes, bolts or screws passing through the said bolt-holes and engaging the wheel-rim, and a cushion-tire clamped between the two tire-retainer sections, substantially as described.

2. The combination with a wheel-rim, of a tire-retainer, consisting of two circular sections having similar inclined surfaces seated one upon the other, each section having at one edge an outwardly-projecting flange provided at its inner side with a dovetail or groove, and one section having bolt-holes and the other lateral open-ended slots terminating in bolt-holes, bolts or screws passing through the said bolt-holes of the two superimposed sections and engaged with the wheel-rim, and an elastic tire having lateral dovetail projections or ribs seated in the dovetails or grooves of the outwardly-projecting flanges, substantially as described.

In testimony whereof I have hereunto set my hand in presence of two subscribing witnesses.

LEONIDAS NICHOLAS LYON, Jr.

Witnesses:
T. S. WALLACE,
M. L. HULL.